(12) United States Patent
Savard et al.

(10) Patent No.: US 9,888,275 B2
(45) Date of Patent: *Feb. 6, 2018

(54) APPARATUS AND METHOD FOR DISPLAYING CONTENT

(71) Applicant: AT&T INTELLECTUAL PROPERTY I, LP, Atlanta, GA (US)

(72) Inventors: Jason Savard, San Antonio, TX (US); Michael Raftelis, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/867,163

(22) Filed: Sep. 28, 2015

(65) Prior Publication Data

US 2016/0021410 A1 Jan. 21, 2016

Related U.S. Application Data

(63) Continuation of application No. 14/498,196, filed on Sep. 26, 2014, now Pat. No. 9,179,187, which is a
(Continued)

(51) Int. Cl.
*H04N 7/15* (2006.01)
*H04N 21/258* (2011.01)
(Continued)

(52) U.S. Cl.
CPC ... *H04N 21/25816* (2013.01); *H04L 41/5054* (2013.01); *H04L 65/1016* (2013.01); *H04L 65/4076* (2013.01); *H04N 7/141* (2013.01); *H04N 7/155* (2013.01); *H04N 7/162* (2013.01); *H04N 7/17318* (2013.01); *H04N 21/2187* (2013.01); *H04N 21/2541* (2013.01); *H04N 21/25875* (2013.01); *H04N 21/4223* (2013.01); *H04N 21/436* (2013.01); *H04N 21/4312* (2013.01); *H04N 21/4382* (2013.01); *H04N 21/4383* (2013.01); *H04N 21/43622* (2013.01); *H04N 21/44227* (2013.01); *H04N 21/4532* (2013.01); *H04N 21/4622* (2013.01);
(Continued)

(58) Field of Classification Search
CPC ....... H04N 21/25816; H04N 21/25875; H04N 21/482
See application file for complete search history.

(56) References Cited

U.S. PATENT DOCUMENTS 7,006,613 B2 2/2006 Novak et al.
7,245,614 B1 7/2007 Podar et al.
(Continued)

*Primary Examiner* — Robert Hance
(74) *Attorney, Agent, or Firm* — Guntin & Gust, PLC; Douglas Schnabel

(57) ABSTRACT

A system that incorporates teachings of the present disclosure may include, for example, a set-top-box (STB) having a controller to join a multicast group having an associated multicast address, wherein the multicast address is associated with a first content type of a plurality of content types, access encoded content associated with the first content type from the multicast address, wherein the encoded content is transmitted by at least one source associated with the multicast group to the multicast address, decode the accessed encoded content, and display the decoded content on a channel mapped to the multicast address. Other embodiments are disclosed.

20 Claims, 6 Drawing Sheets

Related U.S. Application Data continuation of application No. 12/557,160, filed on Sep. 10, 2009, now Pat. No. 8,875,179.

(51) Int. Cl.

| | | |
|---|---|---|
| *H04L 12/24* | (2006.01) | |
| *H04L 29/06* | (2006.01) | |
| *H04N 7/14* | (2006.01) | |
| *H04N 7/16* | (2011.01) | |
| *H04N 7/173* | (2011.01) | |
| *H04N 21/2187* | (2011.01) | |
| *H04N 21/254* | (2011.01) | |
| *H04N 21/4223* | (2011.01) | |
| *H04N 21/436* | (2011.01) | |
| *H04N 21/431* | (2011.01) | |
| *H04N 21/438* | (2011.01) | |
| *H04N 21/442* | (2011.01) | |
| *H04N 21/45* | (2011.01) | |
| *H04N 21/462* | (2011.01) | |
| *H04N 21/472* | (2011.01) | |
| *H04N 21/482* | (2011.01) | |
| *H04N 21/61* | (2011.01) | |
| *H04N 21/6405* | (2011.01) | |
| *H04N 21/643* | (2011.01) | |

(52) U.S. Cl.
CPC ..... *H04N 21/47202* (2013.01); *H04N 21/482* (2013.01); *H04N 21/6125* (2013.01); *H04N 21/6405* (2013.01); *H04N 21/64322* (2013.01); *H04N 2201/3246* (2013.01)

(56) References Cited

U.S. PATENT DOCUMENTS

| | | | |
|---|---|---|---|
| 7,843,865 B2 | 11/2010 | Kumar | |
| 8,625,589 B2 | 1/2014 | Chen et al. | |
| 2002/0049977 A1 | 4/2002 | Miller et al. | |
| 2002/0184314 A1 | 12/2002 | Riise | |
| 2003/0051248 A1 | 3/2003 | Pelly et al. | |
| 2003/0147392 A1* | 8/2003 | Hayashi | H04L 12/185 370/390 |
| 2005/0028219 A1* | 2/2005 | Atzmon | H04N 21/654 725/116 |
| 2005/0083440 A1 | 4/2005 | Kang et al. | |
| 2005/0114901 A1* | 5/2005 | Yui | H04N 7/163 725/100 |
| 2005/0262529 A1* | 11/2005 | Neogi | H04N 7/1675 725/31 |
| 2006/0174276 A1* | 8/2006 | Derrenberger | H04N 7/165 725/46 |
| 2007/0136768 A1* | 6/2007 | Kumar | H04N 21/4223 725/81 |
| 2008/0022322 A1 | 1/2008 | Grannan | |
| 2008/0056164 A1 | 3/2008 | Stratton et al. | |
| 2010/0064332 A1 | 3/2010 | Krikorian et al. | |
| 2011/0055416 A1* | 3/2011 | Chen | H04L 12/185 709/231 |
| 2016/0048606 A1* | 2/2016 | Rubinstein | H04N 21/4627 715/234 |

\* cited by examiner

APPARATUS AND METHOD FOR DISPLAYING CONTENT

CROSS-REFERENCE TO RELATED APPLICATION(S)

This application is a continuation of U.S. patent application Ser. No. 14/498,196 filed Sep. 26, 2014 by Jason Savard, et al., (now U.S. Pat. No. 9,179,187), which is a continuation of U.S. patent application Ser. No. 12/557,160 filed Sep. 10, 2009 by Jason Savard et al., (now U.S. Pat. No. 8,875,179). All sections of each of the aforementioned applications are incorporated herein by reference in its entirety.

FIELD OF THE DISCLOSURE

The present disclosure relates generally to media content and displaying media content and more specifically to an apparatus and method for displaying content.

BACKGROUND

The Internet, local area networks, and other networks provide users with a means for experiencing and sharing various types of media content. The media content can often include audio content, video content, text content, still image content, and/or combinations thereof. Media content providing sources can include Internet Protocol Television (IPTV), cable TV, and satellite TV. Additionally, media content can be generated locally at a user's home through devices such as video/audio players, personal computers, video conferencing equipment, cameras, and other devices. In order to access and experience the content, users typically have to utilize the device and/or application that generated the content. However, users often seek to integrate content generated by various devices and/or applications so as to make the content readily accessible.

DETAILED DESCRIPTION

One embodiment of the present disclosure can entail a set-top-box (STB) having a controller to join a multicast group having an associated multicast address, wherein the multicast address is associated with a first content type of a plurality of content types, access encoded content associated with the first content type from the multicast address, wherein the encoded content is transmitted by at least one source associated with the multicast group to the multicast address, decode the accessed encoded content, and display the decoded content on a channel mapped to the multicast address.

Another embodiment of the present disclosure can entail a method including receiving a request for content from at least one computing device in a multicast group, wherein the content has an associated content type, encoding the requested content, and transmitting the encoded content to a multicast address associated with the content type and the multicast group, wherein the encoded content is obtained by the at least one computing device by accessing the multicast address, wherein the encoded content is decoded by the at least one computing device, and wherein the decoded content is displayed on a channel mapped to the multicast address.

Yet another embodiment of the present disclosure can entail a computer-readable storage medium having computer instructions to connect a computing device and a source device to a multicast group, wherein the multicast group has an associated multicast address, and wherein the multicast address is associated with a content type, receive a request for content from the at least one computing device, wherein the content is of the content type, and transmit the request to the at least one source device, wherein the at least one source device transmits the content to the multicast address in response to the request, wherein the computing device accesses the content from the multicast address, and wherein the computing device displays the content on a channel mapped to the multicast address.

Figure 1:
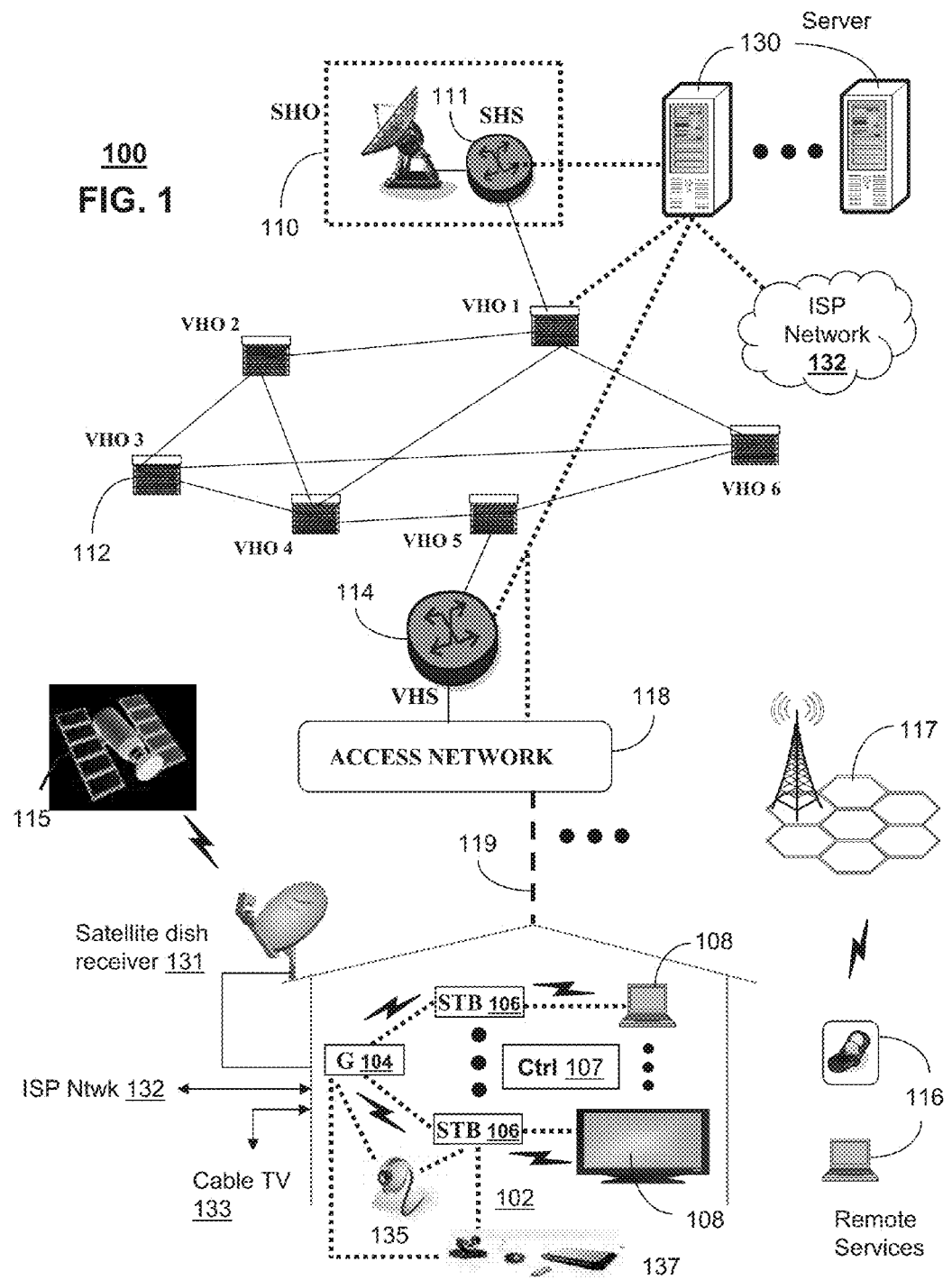
FIGS. 1-2 depict illustrative embodiments of communication systems that provide media services.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

The first communication system 100 can also include a security camera 135. The security camera 135 can be operably coupled to at least one of the STBs 106, the gateway 104, and/or other devices in the system 100. Notably, the security camera 135 can be utilized to capture and generate media content and transmit the media content to the gateway 104, the STBs 106, or to other devices in system 100. The media content can include audio content, video content, still image content, and/or combinations thereof. The security camera 135 can be configured to capture content continuously or at predetermined times. Any captured media content can be transmitted to the gateway 104 and/or the STBs 106 in real-time or based on a schedule.

Additionally, the communication system 100 can also include video conferencing equipment 137, which can also be operably coupled to the STBs 106, the gateway 104, and/or other devices in the system 100. The video conferencing equipment 137 can also capture and generate media content, such as speech and video during a video conference. Once the media content is generated, the content can be transmitted to and/or accessed by the gateway 104, the STBs 106, or to other devices in system 100. Notably, the security camera 135 and the video conferencing equipment 137 can operate in a local area network, along with other devices in the system 100. The local area network, for example, can be a private network, which can include the devices within the residential building 102 and can be a network separate from the other networks in the system 100.

Another distinct portion of the computing devices 130 can function as a server (herein referred to as server 130). The server 130 can use common computing and communication technology to perform the function of distributing media content and/or other types of content to various devices in the system 100. Notably, the server 130 can be operably coupled to the gateway 104 either directly or indirectly, such as through access network 118. Additionally, the server 130 can be configured to access and/or receive content from a local area network containing the security camera 135 and the video conferencing equipment 137 via gateway 104. Other devices can access the content from the server 130 if they are authorized to do so.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
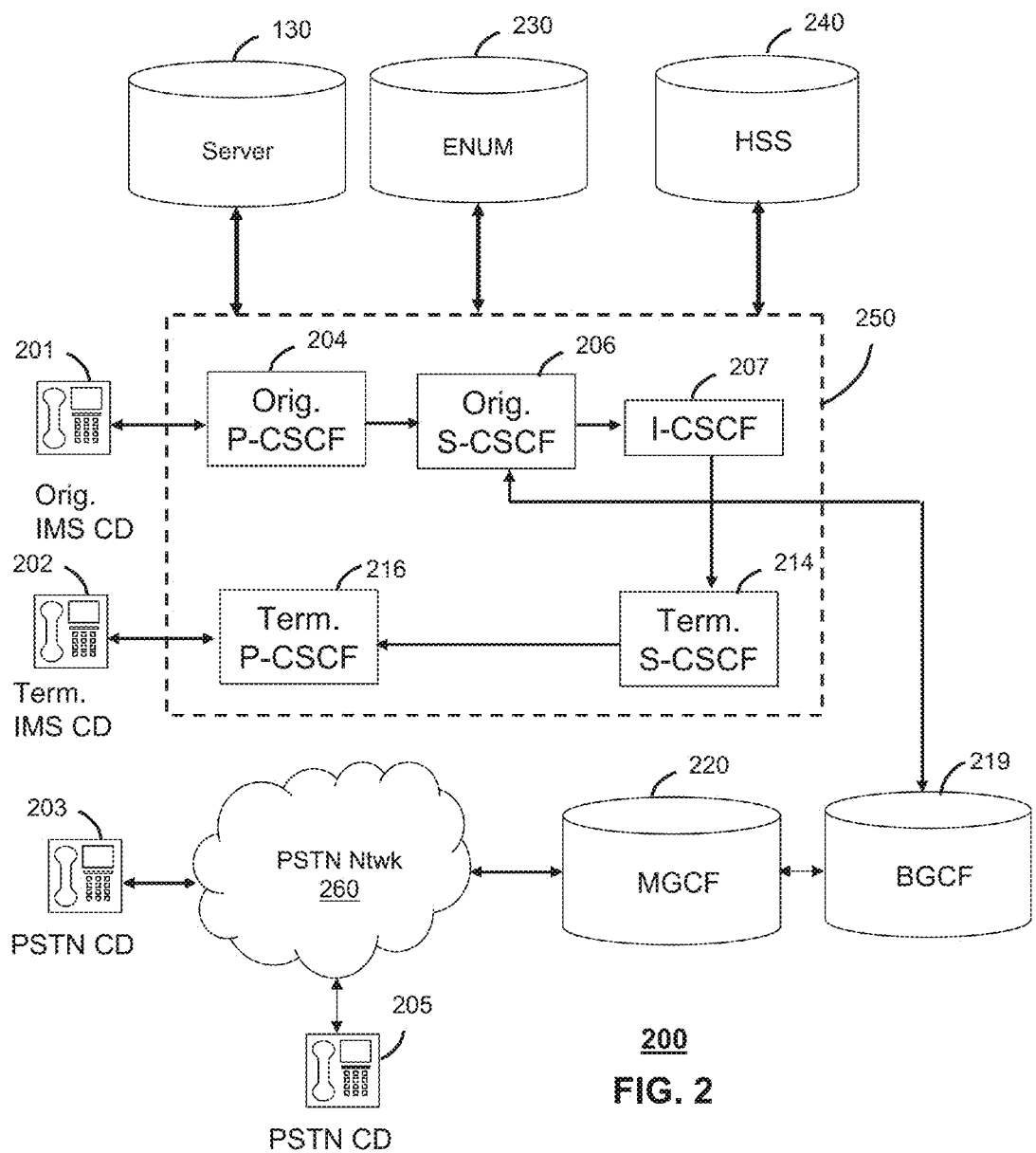

FIG. 2 depicts an illustrative embodiment of a communication system 200. employing an IP Multimedia Subsystem (IMS) network architecture to facilitate the combined services of circuit-switched and packet-switched systems. Communication system 200 can be overlaid or operably coupled with communication system 100 as another representative embodiment of communication system 100.

Communication system 200 can comprise a Home Subscriber Server (HSS) 240, a tElephone NUmber Mapping (ENUM) server 230, and other common network elements of an IMS network 250. The IMS network 250 can establish communications between IMS compliant communication devices (CD) 201, 202, Public Switched Telephone Network (PSTN) CDs 203, 205, and combinations thereof by way of a Media Gateway Control Function (MGCF) 220 coupled to a PSTN network 260.

IMS CDs 201, 202 can register with the IMS network 250 by contacting a Proxy Call Session Control Function (P-CSCF) which communicates with a corresponding Serving CSCF (S-CSCF) to register the CDs with at the HSS 240. To initiate a communication session between CDs, an originating IMS CD 201 can submit a Session Initiation Protocol (SIP INVITE) message to an originating P-CSCF 204 which communicates with a corresponding originating S-CSCF 206. The originating S-CSCF 206 can submit queries to the ENUM system 230 to translate an E.164 telephone number in the SIP INVITE to a SIP Uniform Resource Identifier (URI) if the terminating communication device is IMS compliant.

The SIP URI can be used by an Interrogating CSCF (I-CSCF) 207 to submit a query to the HSS 240 to identify a terminating S-CSCF 214 associated with a terminating IMS CD such as reference 202. Once identified, the I-CSCF 207 can submit the SIP INVITE to the terminating S-CSCF 214. The terminating S-CSCF 214 can then identify a terminating P-CSCF 216 associated with the terminating CD 202. The P-CSCF 216 then signals the CD 202 to establish communications.

If the terminating communication device is instead a PSTN CD such as references 203 or 205, the ENUM system 230 can respond with an unsuccessful address resolution which can cause the originating S-CSCF 206 to forward the call to the MGCF 220 via a Breakout Gateway Control Function (BGCF) 219. The MGCF 220 can then initiate the call to the terminating PSTN CD by common means over the PSTN network 260.

The aforementioned communication process is symmetrical. Accordingly, the terms "originating" and "terminating" in FIG. 2 are interchangeable. It is further noted that communication system 200 can be adapted to support video conferencing by way of common protocols such as H.323. In addition, communication system 200 can be adapted to provide the IMS CDs 201, 203 the multimedia and Internet services of communication system 100.

The servers 130 of FIG. 1 can be operably coupled to the second communication system 200 for purposes similar to those described above.

Figure 3:
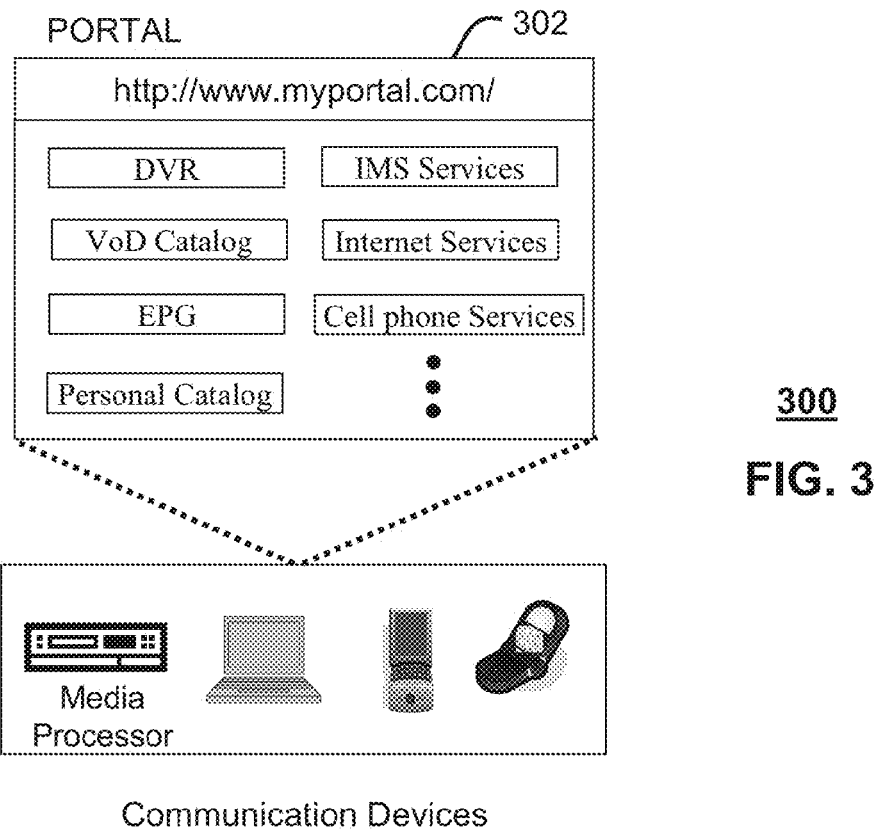
FIG. 3 depicts an illustrative embodiment of a portal interacting with the communication systems of FIGS. 1-2.

FIG. 3 depicts an illustrative embodiment of a portal 302 which can operate from the computing devices 130 described earlier of communication 100 illustrated in FIG. 1. The portal 302 can be used for managing services of communication systems 100-200. The portal 302 can be accessed by a Uniform Resource Locator (URL) with a common Internet browser such as Microsoft's Internet Explorer™ using an Internet-capable communication device such as those described for FIGS. 1-2. The portal 302 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on.

Figure 4:
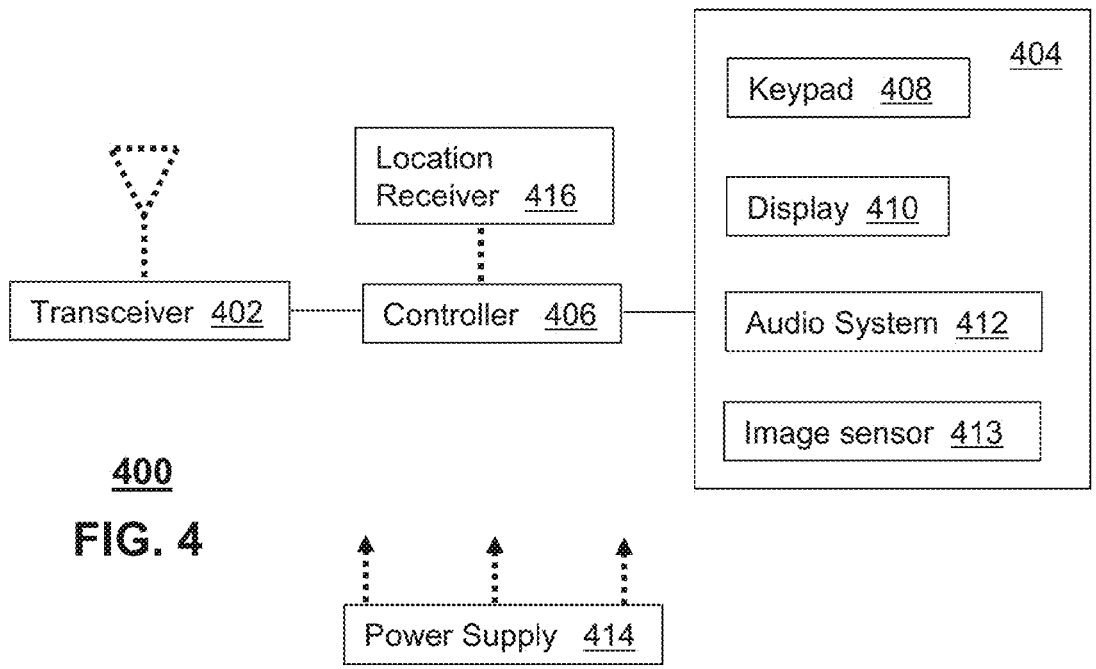
FIG. 4 depicts an illustrative embodiment of a communication device utilized in the communication systems of FIGS. 1-2.

FIG. 4 depicts an exemplary embodiment of a communication device 400. Communication device 400 can serve in whole or in part as an illustrative embodiment of the communication devices of FIGS. 1-2. The communication device 400 can comprise a wireline and/or wireless transceiver 402 (herein transceiver 402), a user interface (UI) 404, a power supply 414, a location receiver 416, and a controller 406 for managing operations thereof. The transceiver 402 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1×, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 404 can include a depressible or touch-sensitive keypad 408 with a navigation mechanism such as a roller ball, joystick, mouse, or navigation disk for manipulating operations of the communication device 400. The keypad 408 can be an integral part of a housing assembly of the communication device 400 or an independent device operably coupled thereto by a tethered wireline interface (such as a USB cable) or a wireless interface supporting for example Bluetooth. The keypad 408 can represent a numeric dialing keypad commonly used by phones, and/or a Qwerty keypad with alphanumeric keys. The UI 404 can further include a display 410 such as monochrome or color LCD (Liquid Crystal Display), OLED (Organic Light Emitting Diode) or other suitable display technology for conveying images to an end user of the communication device 400. In an embodiment where the display 410 is touch-sensitive, a portion or all of the keypad 408 can be presented by way of the display.

The UI 404 can also include an audio system 412 that utilizes common audio technology for conveying low volume audio (such as audio heard only in the proximity of a human ear) and high volume audio (such as speakerphone for hands free operation). The audio system 412 can further include a microphone for receiving audible signals of an end user. The audio system 412 can also be used for voice recognition applications. The UI 404 can further include an image sensor 413 such as a charged coupled device (CCD) camera for capturing still or moving images.

The power supply 414 can utilize common power management technologies such as replaceable and rechargeable batteries, supply regulation technologies, and charging system technologies for supplying energy to the components of the communication device 400 to facilitate long-range or short-range portable applications. The location receiver 416 can utilize common location technology such as a global positioning system (GPS) receiver for identifying a location of the communication device 400 based on signals generated by a constellation of GPS satellites, thereby facilitating common location services such as navigation.

The communication device 400 can use the transceiver 402 to also determine a proximity to a cellular, WiFi or Bluetooth access point by common power sensing techniques such as utilizing a received signal strength indicator (RSSI) and/or a signal time of arrival (TOA) or time of flight (TOF). The controller 406 can utilize computing technologies such as a microprocessor, a digital signal processor (DSP), and/or a video processor with associated storage memory such a Flash, ROM, RAM, SRAM, DRAM or other storage technologies.

The communication device 400 can be adapted to perform the functions of the media processor 106, the media devices 108, or the portable communication devices 116 of FIG. 1, as well as the IMS CDs 201-202 and PSTN CDs 203-205 of FIG. 2. It will be appreciated that the communication device 400 can also represent other common devices that can operate in communication systems 100-200 of FIGS. 1-2 such as a gaming console and a media player.

Figure 5:
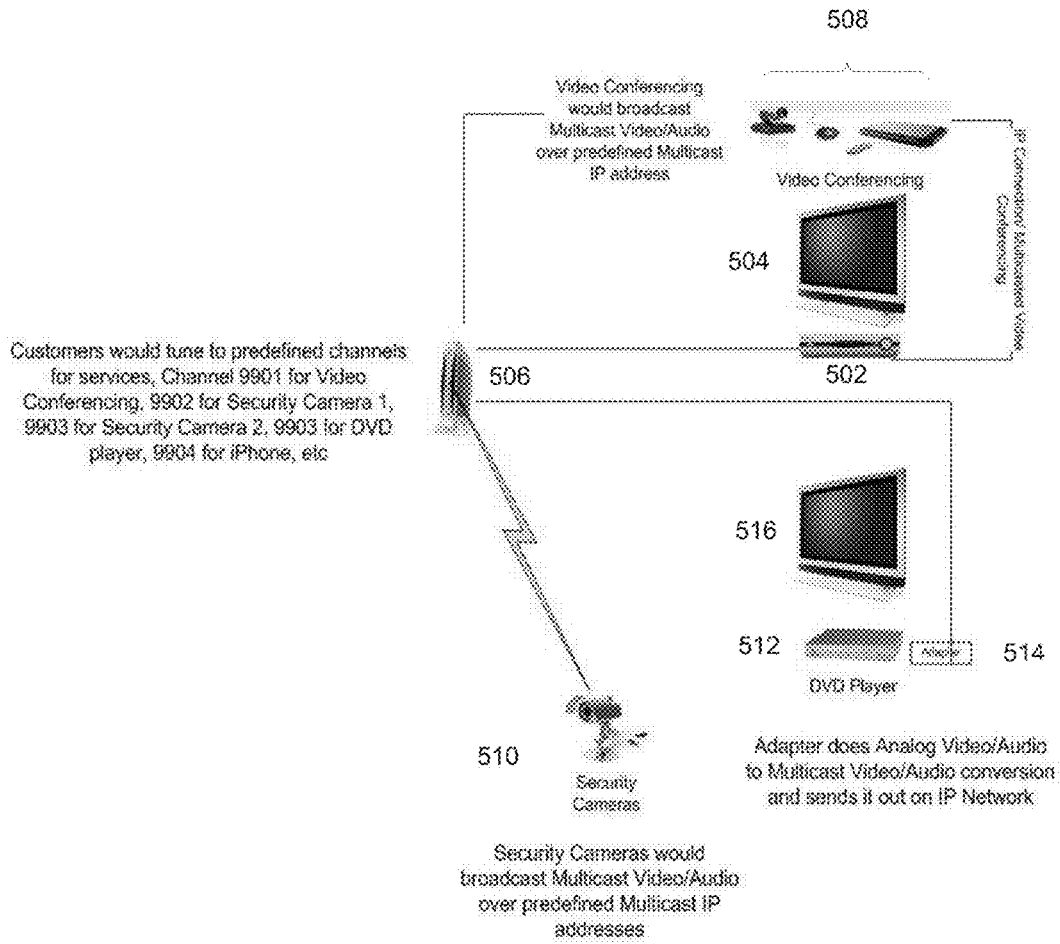
FIG. 5 depicts an illustrative embodiment of a system for displaying content, which can operate in portions of the communications systems of FIGS. 1-2.

FIG. 5 depicts an illustrative embodiment of a system 500 for displaying content, the system operable in portions of the communication systems of FIGS. 1-2. The system 500 can include a STB 502, which can be operably coupled to a display device 504. The display device 504 can be a monitor, television, or other similar device. Additionally, the system 500 can include a gateway/router 506, which can be configured to serve as an interface between the STB 502 and the other devices in the system 500. Notably, the gateway 506 can also be configured to receive signaling information from the various devices in the system 500. The system 500 can further include video conferencing equipment 508, which can be operably coupled to gateway 506 and can be configured to broadcast multicast video, audio, or other content to a multicast address.

In addition, the system 500 can include surveillance/security cameras 510, which like the video conferencing equipment 408, can be operably coupled to the gateway 506 and can be configured to broadcast multicast video, audio, or other content to a multicast address. System 500 can further include a Digital Video Disc (DVD) player 512, which can include an adapter 514. The adapter 514 can be configured to convert analog media content to multicast media content. Once, converted that multicast media content can be transmitted by the adapter 514 to a multicast address. The DVD player 512 can also be operably coupled to a display device 516. The aforementioned devices can be configured to be operate in a local area network and can be configured to be able to communicatively link to an iTV network. Of course, other devices, such as personal computers, video cameras, and other music and video devices can be incorporated into the system 500.

Notably, a set of multicast addresses can be defined and assigned based on the type of media traffic associated with a particular application or device. For example, traffic/content associated with the video conferencing equipment 508 can be assigned multicast address 239.x.x.1, traffic associated with the security cameras 510 can be assigned multicast address 239.x.x.2, and traffic associated with the DVD player 512 can be assigned 239.x.x.3. As an example, the video conferencing equipment can broadcast multicast video and/or audio content over multicast address 239.x.1. As new types of traffic are added, multicast addresses can be reserved for each new type.

The content generated by the devices of system 500 can be integrated into an IPTV service so as to allow content generated by the devices to be displayed on any television/monitor in a user's home. For example, content generated by the security camera 510 can be transmitted to multicast address 239.x.x.2 and the multicast address can be mapped to a channel, such as channel 9902. A user can then view the content from the security camera on a display device, such as display device 504 via channel 9902.

Figure 6:
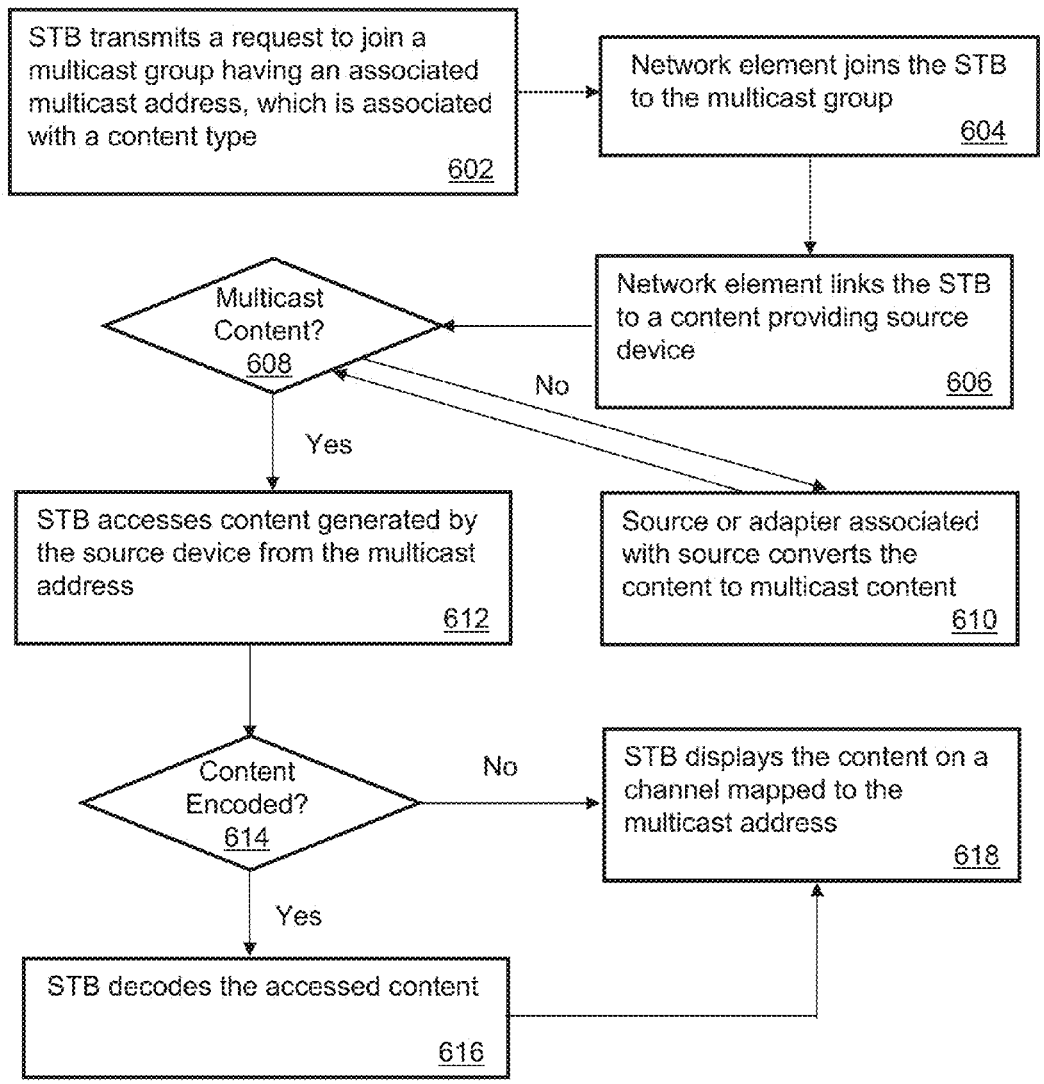
FIG. 6 depicts an illustrative embodiment of a method operating in portions of the communication systems of FIGS. 1-2 and 5.

FIG. 6 depicts an illustrative method 600 that operates in portions of the communication systems of FIG. 1-2 and FIG. 5. The method 600 can involve integrating locally generated content that is on a user's local area network into an IPTV service so as to enable the user or others to access the content on a media device. Method 600 can begin with step 602 in which an STB, such as STB 502, or other media device can transmit a request to join a multicast group to a network element, such as gateway 506, server, or other similar device. The multicast group can have an associated multicast address, which can be associated with a content type. The content type can include video conferencing content, security camera content, video content, internet content, music content, image content, and/or data content. An iTV provider can set aside a block of 128 multicast addresses, each of which can be associated with a certain type of traffic. For example, as noted above, video conferencing traffic/content can be assigned multicast address 239.x.x.1. At step 604, network element can join the STB 502 to the multicast group so that the STB 502 can access locally generated content. Notably, the gateway can determine that multicast address associated with the multicast group is for home use based on the address and, in doing so, can join the multicast group locally rather than sending the request to another outside network.

The network element/gateway can communicatively link the STB 502 to a source device at step 606. A source device can be a device which generates and/or provides content such as video conferencing equipment 508, security camera 510, and DVD player 512. The content can be one of video conferencing content, security camera content, video content, internet content, music content, image content, and/or data content. The source device can also be configured to join the multicast group. The devices that are a part of the multicast group can be part of a local area network and any content generated by devices in the group can be restricted to the group. Once the STB 502 is communicatively linked to the source device, it can be determined if the content is multicast content in step 608. If the content is not multicast content, the source device or an adapter 514 communicatively linked to the source device can convert the content into multicast content at step 610. For example, if the content is in an analog form, the adapter 514 can convert the analog content into multicast content and transmit the content over the associated multicast address.

At step 612, the STB 502 can access the content generated by the source device from the multicast address associated with the content type. Once the content is accessed by the STB 502, the STB 502 can determine if the content was encoded by the source device or by another device at step 614. If the content is encoded, the STB 502 can decode the encoded content at step 616. Once the content is decoded or in the case where the content was not encoded in the first place, the STB 502 can then display the content on a channel mapped to the multicast address at step 618.

For example, if the content type was video conferencing content, the defined multicast address for multicast content could be 239.x.x.1. The multicast address could be mapped to a particular television channel, such as channel 9901. The STB 502 can access the content from the video conference equipment via the multicast address and can display the content on channel 9901. Similarly, other types of content associated with other multicast addresses can be mapped to other channels. Security camera content can be displayed on channel 9902 and DVD content could be displayed on channel 9903 for instance.

By allowing the STB 502 to access locally generated content via a multicast address, the STB 502 can display the content on any television or other media device in the user's home. In an embodiment, a user can access the channel by directly changing the channel, such as through a remote control. Using the above example, if the user would like to access video conferencing content, the user can simply use the remote control to switch the channel to 9901. Once the user switches the channel, the user can watch the video conferencing content on the television of his or choosing. In another example, DVD player 512 can in essence be converted into a network DVD player by utilizing the invention. The DVD player 512 can transmit content associated with a DVD movie to the associated multicast address and now the content can be played on a channel mapped to multicast address on any television in the house since STB 502 can access the content.

Upon reviewing the aforementioned embodiments, it would be evident to an artisan with ordinary skill in the art that said embodiments can be modified, reduced, or enhanced without departing from the scope and spirit of the claims described below. For example, in one embodiment, the user can utilize an application menu associated with the STB 502 to select which type of content the user wants view. If the user wanted to view the security camera content, the user can select a security camera icon on the menu to launch the multicast channel associated with the security camera content. Of course, the user can also select the channel directly from the menu as well. In another embodiment, if the application requires the display of content on one of the local multicast channels, the STB 502 can initiate a force tune to automatically go to the multicast channel.

In one embodiment, devices outside the local area network of the user can be configured to access the multicast channel if authorized to do so. For example, if one user has a local network with multicast channels and the user would like someone else to be able to watch his home without having to be at the user's home, the other person can be granted access to the multicast channel, such as by authenticating into the user's network or through other authorized means.

Other suitable modifications can be applied to the present disclosure without departing from the scope of the claims below. Accordingly, the reader is directed to the claims section for a fuller understanding of the breadth and scope of the present disclosure.

Figure 7:
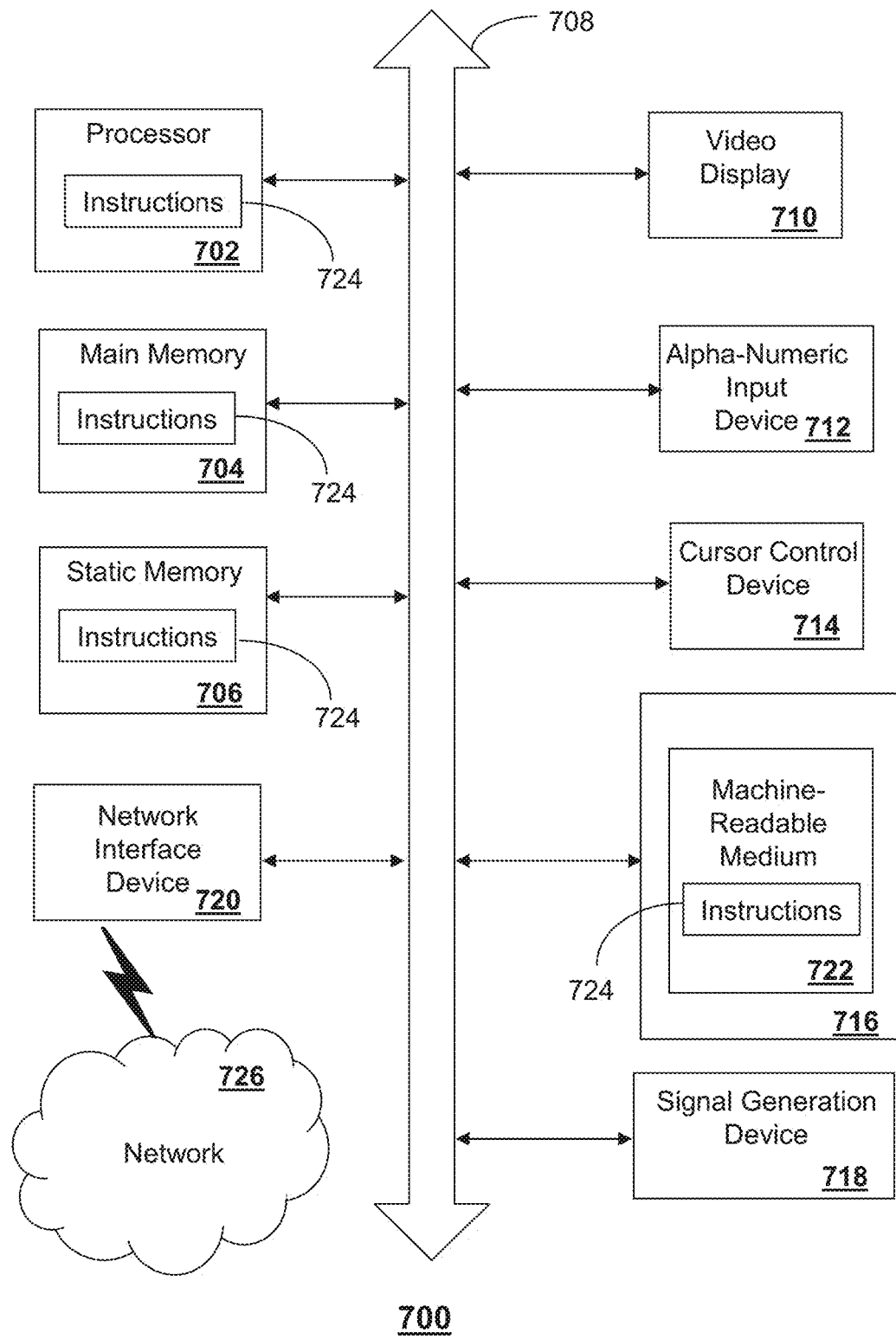
FIG. 7 is a diagrammatic representation of a machine in the form of a computer system within which a set of instructions, when executed, may cause the machine to perform any one or more of the methodologies discussed herein.

FIG. 7 depicts an exemplary diagrammatic representation of a machine in the form of a computer system 700 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 700 may include a processor 702 (e.g., a central processing unit (CPU), a graphics processing unit (GPU, or both), a main memory 704 and a static memory 706, which communicate with each other via a bus 708. The computer system 700 may further include a video display unit 710 (e.g., a liquid crystal display (LCD), a flat panel, a solid state display, or a cathode ray tube (CRT)). The computer system 700 may include an input device 712 (e.g., a keyboard), a cursor control device 714 (e.g., a mouse), a disk drive unit 716, a signal generation device 718 (e.g., a speaker or remote control) and a network interface device 720.

The disk drive unit 716 may include a machine-readable medium 722 on which is stored one or more sets of instructions (e.g., software 724) embodying any one or more of the methodologies or functions described herein, including those methods illustrated above. The instructions 724 may also reside, completely or at least partially, within the main memory 704, the static memory 706, and/or within the processor 702 during execution thereof by the computer system 700. The main memory 704 and the processor 702 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 724, or that which receives and executes instructions 724 from a propagated signal so that a device connected to a network environment 726 can send or receive voice, video or data, and to communicate over the network 726 using the instructions 724. The instructions 724 may further be transmitted or received over a network 726 via the network interface device 720.

While the machine-readable medium 722 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A media processor device, comprising:
a processing system comprising a processor; and
a memory that stores executable instructions that, when executed by the processing system, facilitate performance of operations, comprising:
communicating with a content network via a local gateway device of a first local area network;
joining a multicast group on a second local area network that is remote from the first local area network;
responsive to joining the multicast group, receiving encoded video content that is captured by a video camera streaming the encoded video content to the second local area network, wherein the video camera is associated with a multicast address of the multicast group;
decoding the encoded video content to generate decoded content;
mapping the decoded content to a television channel for display at a local display device;
receiving a request from a remote media device for access to the decoded content of the television channel, wherein the remote media device is outside of the first local area network;
authenticating the remote media device to access the decoded content responsive to the request; and
enabling the remote media device to access the decoded content responsive to authenticating of the remote media device.

2. The media processor device of claim 1, wherein the streaming to the second local area network is by way of the local gateway device.

3. The media processor device of claim 1, wherein the operations further comprise:
presenting, at the local display device an icon that is associated with the video camera; and
receiving a selection of the icon.

4. The media processor device of claim 3, wherein the operations further comprise joining the multicast group that is associated with the video camera responsive to the receiving of the selection of the icon.

5. The media processor device of claim 4, wherein the operations further comprise transmitting authenticating information to the video camera for joining the multicast group associated with the video camera.

6. The media processor device of claim 1, wherein the encoded video content is converted by the video camera into multicast content when the encoded video content is one of analog content or non-multicast content.

7. The media processor device of claim 1, wherein the video camera comprises one of a computer, a digital video player, a handheld device, a security camera, teleconferencing equipment, or any combination thereof.

8. The media processor device of claim 1, wherein the operations further comprise receiving second encoded video content that is associated with a second multicast group.

9. A video camera device, comprising:
a processing system including a processor; and
a memory that stores executable instructions that, when executed by the processing system, facilitate performance of operations, comprising:
capturing video content;
receiving a request from a media processor device to access the video content through a multicast group that has an associated multicast address, wherein the media processor device maps video content available on the associated multicast address to a television channel, wherein the media processor device communicates with a content network via a local gateway of a first local area network, wherein the multicast group operates at a second local area network remote from the first local area network; and
transmitting the video content to the media processor device on the first local area network responsive to the request via the associated multicast address, wherein a media device accesses the video content from the media processor device via the television channel of the media processor device.

10. The video camera device of claim 9, wherein the operations further comprise joining the media processor device to the multicast group responsive to the request from the media processor device.

11. The video camera device of claim 10, wherein the media processor device presents an icon that is associated with the video camera device at a display device, and wherein the media processor device generates the request to access the video content responsive to a selection of the icon.

12. The video camera device of claim 9, wherein an authentication is received by the media processor device from the media device that is remote from the media processor device.

13. The video camera device of claim 9, wherein the transmitting of the video content to the media processor device is via a local gateway device in the first local area network.

14. The video camera device of claim 13, wherein the media device that accesses the video content from the media processor device via a television channel of the media processor device operates in a third local area network.

15. A non-transitory computer-readable storage medium, comprising executable instructions which when executed by a processing system including a processor facilitates performing of operations comprising:
authenticating, via a media processor device operating on a first local area network, a computing device to access a television channel of the media processor device for providing video content that is associated with a video camera of a second local area network to members of a multicast group, and wherein a multicast address associated with the multicast group is mapped to the television channel of the media processor device; and
transmitting live video content of the video camera to the computing device responsive to the authenticating of the computing device, wherein the computing device displays the live video content on a television channel that is mapped to the multicast address that is associated with the multicast group by a content network.

16. The non-transitory computer-readable storage medium of claim 15, wherein the live video content is encoded by the video camera and decoded by the media processor device.

17. The non-transitory computer-readable storage medium of claim 15, wherein the live video content comprises one of video conferencing content, security camera content, or any combination thereof.

18. The non-transitory computer-readable storage medium of claim 15, wherein content network comprises one of an internet protocol television network, an interactive satellite television network, or any combination thereof.

19. The non-transitory computer-readable storage medium of claim 15, wherein the transmitting of the live video content to the computing device is via a local gateway device in the first local area network.

20. The non-transitory computer-readable storage medium of claim 15, wherein the operations further comprise joining the computer device to the multicast group.

\* \* \* \* \*